US007993439B2

(12) United States Patent
Kaeppler et al.

(10) Patent No.: US 7,993,439 B2
(45) Date of Patent: Aug. 9, 2011

(54) PRINTING INK CONCENTRATE AND METHOD FOR ITS PRODUCTION

(75) Inventors: Olaf Kaeppler, Markt Schwaben (DE); Volker Kittlaus, Muenhen (DE); Hans-Georg Wittmann, Poing (DE); Manuela Mittermeier, Taufkirchen/Vils (DE)

(73) Assignee: Michael Huber Muenchen GmbH, Kirchheim (DE)

( * ) Notice: Subject to any disclaimer, the term of this patent is extended or adjusted under 35 U.S.C. 154(b) by 0 days.

(21) Appl. No.: 10/992,698

(22) Filed: Nov. 22, 2004

(65) Prior Publication Data

US 2005/0120906 A1    Jun. 9, 2005

Related U.S. Application Data

(63) Continuation of application No. PCT/DE03/01553, filed on May 14, 2003.

(30) Foreign Application Priority Data

May 23, 2002 (DE) .................................. 102 22 900

(51) Int. Cl.
*C09D 11/02* (2006.01)

(52) U.S. Cl. ............... 106/31.33; 106/31.65; 106/31.66; 106/31.34; 106/31.3; 106/31.62; 427/212

(58) Field of Classification Search ............... 106/31.33, 106/31.65, 31.66, 31.34, 31.3, 31.62; 427/212
See application file for complete search history.

(56) References Cited

U.S. PATENT DOCUMENTS

| 3,583,877 | A | | 6/1971 | Rosenblum et al. | |
|---|---|---|---|---|---|
| 4,015,999 | A | | 4/1977 | Robertson et al. | |
| 4,116,924 | A | * | 9/1978 | Peabody | 524/270 |
| 4,277,288 | A | * | 7/1981 | Lawrence et al. | 106/413 |
| 4,725,317 | A | * | 2/1988 | Wheeler | 106/403 |
| 4,990,187 | A | | 2/1991 | Dien et al. | |
| 5,543,219 | A | * | 8/1996 | Elwakil | 428/402.24 |
| 5,902,391 | A | | 5/1999 | Becker et al. | |
| 5,919,838 | A | | 7/1999 | Mizobuchi | |
| 6,712,862 | B1 | | 3/2004 | Grimm et al. | |

FOREIGN PATENT DOCUMENTS

| EP | 0807670 | 11/1997 |
|---|---|---|
| GB | 2324097 | 10/1998 |
| RU | 2177016 | 12/2001 |
| WO | 9905226 | 2/1999 |

* cited by examiner

*Primary Examiner* — Jerry Lorengo
*Assistant Examiner* — Veronica Faison-Gee
(74) *Attorney, Agent, or Firm* — Greenblum & Bernstein, P.L.C.

(57) ABSTRACT

A printing ink concentrate in the form of coated non-tacky and/or uncoated non-tacky pellets, a method for producing the same and a method of making a printing ink by using the concentrate.

39 Claims, No Drawings

PRINTING INK CONCENTRATE AND METHOD FOR ITS PRODUCTION

CROSS-REFERENCE TO RELATED APPLICATIONS

The present application is a continuation of International Patent Application No. PCT/DE03/01553, filed May 14, 2003, the entire disclosure of which is expressly incorporated by reference herein, which claims priority under 35 U.S.C. §119 of German Patent Application No. 102 22 900.7, filed May 23, 2002.

BACKGROUND OF THE INVENTION

1. Field of the Invention

The invention relates to a printing ink concentrate and a method for its production.

2. Discussion of Background Information

Printing inks are usually produced by combining the starting materials pigment, vehicles, additives and liquids and subsequent dispersion. The dispersion method is used to break up the pigment agglomerates into the necessary pigment particle size. The properties necessary for the printing ink, such as, e.g., sufficient coloring power and good printability, are thus achieved.

For a more rational and more economic manufacture of printing inks it is also customary to produce an intermediate in the above-mentioned production process. This intermediate is a printing ink concentrate that differs from the customary printing ink in that the pigment concentration is noticeably higher. The proportion of vehicles and liquids is therefore naturally lower. Printing ink concentrates are used to both produce finished printing inks and to increase the coloring material concentration of a printing ink of the same shade and for nuancing printing inks.

Vehicles and liquids are added to the printing ink concentrate for dilution, and the final printing ink is produced by a mixing method. A dispersion method is no longer necessary in the dilution stage, since the printing ink concentrate was produced through a dispersion step from the starting materials pigment, vehicles, additives and liquids.

Concentrates of printing inks therefore differ substantially from pigment preparations in that in a printing ink concentrate the pigments are already present in a dispersed form.

Printing ink concentrates are usually produced by dispersing solids, such as coloring pigments, and solid additives in vehicles and liquids with the aid of dispersion units such as triple-roll mills, kneaders, extruders or ball mills in several stages or in a single-stage process, as described in EP 0 807 670 A1.

With this method, viscous to highly viscous printing ink concentrates result that exhibit a tackiness.

The solids used are pigments, such as Phthalocyanine (CI 15), Pigment Red (CI 57:1), Diaryl Yellow (CI 12/13) and decorative ink pigments and other achromatic solids, also often called fillers, such as chalk, kaolin, butylated hydroxytoluene or dispersion additives. These are used in the form of powders or granules. The vehicles used can be varnishes for printing inks produced by boiling printing ink resins, printing ink oils and alkyds. Alkyds such as linseed oil alkyd, soybean oil alkyd are also used as vehicles. Special mineral oils for printing inks with a boiling range between 230-370° C., such as Printosol® C 800, and vegetable oils, such as linseed oil, soybean oil, are used as liquid components.

Flush pastes represent a form of printing ink concentrates produced in a different manner. They are likewise viscous to highly viscous and exhibit tackiness. Also in flush pastes the pigment is present in the ground fineness necessary for an application as printing ink and does not need to be further dispersed or finish-ground.

After manufacture, these printing ink concentrates are filled into transport containers, such as cans, buckets, drums, hobbocks or production containers. These are used for storing, transporting and for removing the printing ink concentrates.

To produce a finished printing ink, one or more printing ink concentrates are removed, weighed out and mixed, usually with the addition of additives, vehicles or liquid components, such as oils.

Weighing is usually carried out by the manual removal of the printing ink concentrates, e.g., with a spatula, and placement in a weighing container. Another method is represented by the use of so-called metering stations in which the printing ink concentrates are present in storage containers such as hobbocks or drums and are conveyed by means of pumps or hydraulic presses and are metered volumetrically or gravimetrically via metering valves. Such automatic installations are customary in the trade.

The weighed components are subsequently mixed to form the finished ink in mixers such as dissolvers, kneaders, blade mixers or other mixer units with the addition of additives, vehicles and oils. The mixing process serves to homogenize the product. A dispersion of the pigment is no longer necessary here, since this has already taken place during the production of the printing ink concentrate.

The high viscosity and tackiness of the printing ink concentrates represent a problem, especially depending on the pigment quantity used. The higher the proportion of pigment, i.e., the proportion of solids of the concentrate, the more viscous the product. Accordingly, handling, i.e., the manual removal or the pumpability of the printing ink concentrates, becomes more difficult.

A manual removal is often no longer possible. A product removal can only be carried out with considerable technical expense, e.g., by means of high-pressure presses, often assisted by heating the product.

While liquid printing inks can be pumped and conveyed and metered with relatively low expenditure, with pasty printing ink concentrates, complex and expensive suction pumps, such as helicoidal gear pumps or compressed air piston pumps, already have to be used. Due to the number of different shades that are necessary for producing special colors, usually 20 to 60 pump units are required for an automatic mixing plant, which represents a considerable expenditure.

At still higher viscosities of the printing ink concentrates hydraulic presses have to be used in order to achieve a still adequate conveying of the product. This high-pressure technique increases the expense by a multiple. As a rule, a manual removal, e.g., of such concentrates of offset printing inks is no longer possible at all.

It is desirable to overcome the described disadvantages of the prior art and at the same time provide a printing ink concentrate that can be easily transported and easily mixed with additional components.

SUMMARY OF THE INVENTION

The present invention provides a printing ink concentrate which comprises a plurality of non-tacky pellets.

In one aspect of the concentrate, the non-tacky pellets may comprise uncoated pellets.

In another aspect, the non-tacky pellets may comprise pellets with a coating. By way of non-limiting example, the coating may be selected from powdery solids, waxes and/or liquid substances. In another aspect, the coating may comprise an oil. In a still further aspect, the powdery material may be selected from chalk, kaolin, paraffin waxes, PE waxes, Fischer-Tropsch waxes and/or talcum, preferably talcum.

In yet another aspect of the process, the coating may comprise a powdery material having an average grain size of up to 25 μm, for example, an average grain size of smaller than 5 μm.

In another aspect, the concentrate may comprise a pigment and a vehicle. In a still further aspect, the pigment may be dispersed.

In yet another aspect, the concentrate may comprise at least 45% by weight of on or more solid pigments, for example, up to 65% by weight of one or more solid pigments, and/or more than 50% by weight of one or more solid pigments.

In another aspect, the concentrate may have a specific density of from 0.9 to 2.0 g/cm$^3$.

In a still further aspect, the concentrate may comprise a concentrate for an offset printing ink.

The present invention also provides a non-tacky pellet of a printing ink concentrate, which pellet comprises at least 45% by weight of on or more solid pigments.

In one aspect, the pellet may comprise a coating, which coating may, for example, be selected from powdery solids, waxes and/or liquid substances.

In one aspect, the coating may comprise an oil, or the coating may comprise a powdery material selected from at least one of chalk, kaolin, paraffin waxes, PE waxes, Fischer-Tropsch waxes and talcum, preferably talcum.

In yet another aspect, the coating may comprise a powdery material having an average grain size of less than 5 μm.

In a still further aspect, the pellet may have a specific density of from 0.9 to 2.0 g/cm$^3$ and/or a volume of about 0.5 to 1.0 cm$^3$.

In another aspect, the pellet may comprise more than 50% by weight of on or more solid pigments.

In yet another aspect, the pellet may be uncoated. In another aspect, the pellet may further comprise a vehicle and/or the pellet may be substantially spherical.

The present invention also provides a method of reducing the tackiness of a printing ink concentrate. The method comprises providing a concentrate which has a solids content that renders the concentrate capable of being comminuted.

In one aspect of this method, the concentrate may have a pigment concentration of at least 45% by weight, for example, a pigment concentration of more than 50% by weight.

In another aspect, the method may further comprise a coating of the concentrate.

The present invention also provides a method of producing the pigment concentrate of the present invention. This method comprises comminuting a pigment concentrate to form pellets and coating the concentrate to form non-tacky pellets.

In one aspect of the method, the coating may comprise a direct application of a powdery solid onto the concentrate. In another aspect, the coating may comprise an application of a powdery solid in a liquid carrier onto the concentrate and a subsequent evaporation of the liquid carrier.

In yet another aspect of the method, the coating may comprise the application of a melted substance onto the concentrate.

In a still further aspect, the coating may comprise the application of a substance dissolved in a solvent onto the concentrate and subsequently evaporating the solvent.

The present invention also provides a process for making a printing ink. This process comprises a dilution of the printing ink concentrate of the present invention, including the various aspects thereof.

According to the present invention, printing ink concentrates, despite their viscous and tacky properties, are to be employed as a solid. To this end the tacky, highly viscous original printing ink concentrate needs to be changed by altering and adjusting its properties into a new, non-tacky material.

The adjustment takes place through a reduction of the tackiness of the concentrate through an increase in the solids proportion of the concentrate. The flowability and deformability of the printing ink concentrate is reduced by the combination of a high proportion of pigment and a low proportion of vehicle. The printing ink concentrates obtained thereby and the pellets recovered therefrom may still exhibit a slight residual tackiness that can be reduced or eliminated by a subsequent coating or encasing. With the pellets according to the invention, the pigment proportion in the printing ink concentrate is usually 45-65%. The pigment concentration is thus much higher than with conventional printing ink concentrates.

The shape of the pellets is ideally spherical. However, they can also have other symmetrical and asymmetrical shapes.

The size of the pellets is ideally adjusted to the subsequent metering process. The specific density of the printing ink concentrate as a rule is 0.9-2.0 g/cm$^3$. With a weighing precision of +/−1 g, a pellet has a volume of approx. 0.5-1.0 cm$^3$. Depending on the subsequent processes used, the volume can also be selected to be individually different.

The printing ink concentrate according to the invention in the form of coated non-tacky and/or uncoated non-tacky pellets has a number of important advantages.

For example, it can be treated like a bulk material. Thus each pellet can be removed individually and numerically metered. With concentrates for offset printing inks a manual removal is now not only possible, but can be carried out even with particular ease.

The printing ink concentrate according to the invention can thus be easily metered and is thus accessible for a use in standard solids metering installations which renders possible an automation of the weighing and metering process.

Like a solid, the pellets are easy to convey and thus are easily transferable. They can likewise be filled and transported like a pourable solid in an easy manner. Since the pellets do not exhibit any tackiness, a conglutination and coagulation of the particles are ruled out.

With the printing ink concentrates of the prior art, a severe soiling of all parts touched by the product occurs, which entails a high cleaning expenditure, and a disposal problem of the residual amounts and the packaging. In contrast, a soiling by a staining of the surface by printing ink concentrates can now be prevented. The soiling of parts touched by the product is minimal so that the cleaning expenditure is very low. No residues and thus no waste result during emptying, which must be considered to be particularly advantageous for reasons of environmental protection. Moreover, no material loss occurs and simpler packaging can be used.

After weighing, the coated pellets are mixed in conventional mixing units. These include, e.g., dissolvers, kneaders, vibration mixers, eccentric tumblers. A post-dispersion or post-grinding is not necessary.

As a component of the printing ink concentrate, the optionally used coating material becomes a component of the printing ink produced therefrom. The coating material therefore does not need to be removed before further processing.

Furthermore, a method for producing a printing ink using the printing ink concentrate according to the invention is provided.

In this manner, e.g., UV printing inks, water-based flexographic inks, toluene gravure printing inks, solvent-containing printing inks, e.g., based on ethanol and ethyl acetate, nitrocellulose printing inks, screen printing inks, artist inks or tampon printing inks can be produced.

In a preferred embodiment of the invention a printing ink concentrate is provided in which the coating consists of powdery solids, wax or liquid substances. Here, the liquid substance may be an oil.

The respective coating material can thus be optimally adjusted to the respective intended use.

Solid and liquid materials that are compatible with printing inks can be used as coating material. Suitable solid materials are, e.g., powdery materials, such as chalk, kaolin, paraffin waxes, PE waxes, Fischer-Tropsch waxes or talcum. The powdery materials have an average grain size of a maximum of 25 μm, a grain size of less than 5 μm being preferred. Although average grain sizes of over 25 μm can also be used, they lead to problems in the use of the printing ink end product, such as, e.g., to a build-up on the printing plate.

Due to the coating the surface of the pellets virtually no longer exhibits any tacky properties.

In a further preferred embodiment of the invention, the coating of the printing ink concentrate is a solid encasing. Such a complete solid encasing can be, e.g., a wax encasing.

In a particularly preferred embodiment of the invention the printing ink concentrate is a concentrate for an offset printing ink.

Another object of the present invention is a method for producing the printing ink concentrate which is characterized in that the printing ink concentrate is comminuted and coated. The production of the pellets can take place separately, but can also directly follow the production of the printing ink concentrate.

Known methods, as used, e.g., in the production of foodstuffs or animal fodder, can be used for the pelletization.

Here, either a portioned discharge from a nozzle or a metering valve or the production of a strand of printing ink concentrate in a matrix with subsequent separation can be carried out. In extreme cases a strand or thread of printing ink concentrate is produced that is not cut to length until the following processing step of metering.

In a preferred embodiment of the method according to the invention, the coating takes place through the direct application of the powdery solid onto the printing ink concentrate.

The application of the powdery material can take place, e.g., by direct spraying of the pellets or by rolling the pellets in the respective coating material.

In a further preferred embodiment of the method according to the invention the powdery solids are indirectly applied via a liquid carrier that subsequently evaporates.

As a carrier, liquids and solvents are suitable in which the coating material can be suspended or dissolved. The application can take place by spraying or immersing in the suspension or solution. The carrier liquid or the solvent is removed by subsequent drying and the coated pellet remains.

In a further preferred embodiment of the method according to the invention the solid encasing is produced by applying a melted substance or by applying a dissolved substance suitable for encasing, with the solvent subsequently evaporating.

For example, a wax encasing can be produced by melting the wax and subsequent wetting of the surface of the printing ink concentrate. As a wax, e.g., paraffin wax, PE wax and Fischer-Tropsch wax are suitable.

Suitable materials for encasing the printing ink concentrate are, e.g., fats, such as Palmin® or gelatin.

The material suitable for encasing can be dissolved in a carrier liquid that is removed by evaporation after the application onto the uncoated printing ink pellets. Through the repetition of this process, the layer thickness of the encasing can be made as large as desired.

By using high solids proportions of pigment in the printing ink concentrate of over 50%, the residual tackiness of the product can be reduced such that a protective encasing in the form of coating is no longer necessary.

Further advantages thus arise, such as, e.g., the omission of the coating process and the omission of the additional components for the coating.

The invention is described in more detail on the basis of examples for the production of coated and uncoated pellets.

DETAILED DESCRIPTION OF THE INVENTION

Example 1

A printing ink concentrate was produced in a laboratory extruder by filling the extruder with 45% by weight of Pigment Yellow (CI 13) and 55% by weight of offset vehicle Grinding Base 100S by Lawter and removing the printing ink concentrate discharged by the extruder in rod form. After cooling to room temperature, the product exhibits only a slight residual tackiness and no significant deformability. The printing ink concentrate was mechanically cut into pellets of approx. 1 g each.

Then the pellets were immersed in a melted wax paste which consisted of 37.5% by weight of PE wax with a melting range of around 115° C. and 62.5% by weight of linseed oil. Subsequently the pellets were screened and cooled.

The coated pellets thus obtained virtually no longer exhibit any tackiness.

Example 2

A printing ink concentrate that had been produced according to Example 1 was placed in a heated container. When a product temperature of approx. 70° C. was reached, the printing ink concentrate was pressed with the aid of a gear pump through a matrix with a bore hole of 4 mm in diameter. The resultant ink strand of 4 mm thickness was cut into pellets of 10 mm in length and subsequently rolled in a powder of talcum, whereby a coating of the powder material was produced. The excess powder was removed by screening.

The coated pellets thus obtained virtually no longer exhibit any tackiness.

Example 3

Uncoated printing ink pellets were produced according to Example 2 and immersed in an aqueous wax emulsion, subsequently screened and dried in a hot air flow.

The coated pellets thus obtained virtually no longer exhibit any tackiness.

Example 4

Uncoated printing ink pellets were produced according to Example 2 and immersed in a silicone emulsion, subsequently screened and dried in a hot air flow.

The coated pellets thus obtained virtually no longer exhibit any tackiness.

Example 5

A standard flush paste (Pigment Yellow CI 12) was heated in a container. When 60° C. was reached, the flush paste was pressed through a matrix with a hole diameter of 4 mm with the aid of a pump. The printing ink concentrate strand obtained was cut into pellets of 10 mm in length. These were coated according to Example 1.

The coated pellets thus obtained virtually no longer exhibit any tackiness, but are still slightly deformable.

Example 6

Uncoated pellets were produced according to Example 5. These were coated according to Example 2.

The coated pellets thus obtained virtually no longer exhibit any tackiness.

Example 7

Uncoated pellets were produced according to Example 5. These were coated according to Example 3.

The coated pellets thus obtained virtually no longer exhibit any tackiness.

Example 8

Uncoated pellets were produced according to Example 5. These were coated according to Example 4.

The coated pellets thus obtained virtually no longer exhibit any tackiness.

Example 9

A printing ink concentrate according to Example 1 was fed to a matrix with a pressing cylinder. The obtained strand of printing ink concentrate was sprayed with talcum powder dispersed in air and a fine layer was applied to the strand surface. The coated strand was wound up or placed in a container. At the weighing of the finished printing ink formula, the strand was simply cut or pelletized.

The coated strand of printing ink concentrate virtually no longer exhibits any tackiness.

Example 10

A printing ink concentrate according to Example 1 was conveyed into a metering valve. One part of the printing ink concentrate was ejected per each metering stroke.

The pellets of printing ink concentrate thus portioned fell into a fluidized bed that had air nozzles arranged in the base so that the pellets were suspended together with an encasing dusty separating powder of talcum.

The coated pellets thus obtained virtually no longer exhibit any tackiness.

Example 11

A printing ink concentrate that was produced according to Example 1, was guided into a pipe at the outlet of the extruder. The concentrate emerged in partial strands at approx. 100° C. through 25 bore holes arranged laterally in the pipe. The partial strands were placed next to one another on a cooling belt and transported away. The belt was powdered with talcum to avoid the adhesion of the concentrate; the strands of concentrate were likewise provided with powder.

After the concentrate had cooled to 25° C., the strands of concentrate were cut into pieces 20 mm in length in a rotating cutting device. Excess talcum powder was separated in a vibrating screen.

The pellets thus obtained virtually no longer exhibit any tackiness.

Example 12

A printing ink concentrate was produced in a laboratory extruder by filling the extruder with 63% by weight of Pigment Blue (CI 15:3), e.g., Lutetia Cyanine J 505 Micropearl, and 37% by weight of offset vehicle Grinding Base 100S by Lawter, and removing the printing ink concentrate discharged from the extruder in rod form.

After cooling to room temperature, the product no longer exhibits any tackiness and is cut into pellets of approx. 1 cm$^3$ in volume.

What is claimed is:

1. A method of producing an offset printing ink pigment concentrate comprising a plurality of non-tacky pellets which comprise a vehicle and dispersed coloring pigment, wherein the method comprises comminuting a pigment concentrate into pellets and coating the pellets to form non-tacky pellets.

2. The method of claim 1, wherein the coating comprises a direct application of a powdery solid onto the pellets.

3. The method of claim 1, wherein the coating comprises an application of a powdery solid in a liquid carrier onto the pellets and a subsequent evaporation of the liquid carrier.

4. The method of claim 1, wherein the coating comprises applying a melted substance onto the pellets.

5. The method of claim 1, wherein the coating comprises applying a substance dissolved in a solvent onto the pellets and subsequently evaporating the solvent.

6. The method of claim 1, wherein the pellets are coated with one or more substances selected from powdery materials, waxes, and liquids.

7. The method of claim 6, wherein the pellets are coated with an oil.

8. The method of claim 6, wherein the pellets are coated with a powdery material comprising at least one of chalk, kaolin, paraffin waxes, PE waxes, Fischer-Tropsch waxes, and talcum.

9. The method of claim 8, wherein the powdery material comprises talcum.

10. The method of claim 6, wherein the pellets are coated with a powdery material having an average grain size of up to 25 µm.

11. The method of claim 10, wherein the average grain size is smaller than 5 µm.

12. The method of claim 1, wherein the concentrate comprises at least 45% by weight of one or more solid coloring pigments.

13. The method of claim 12, wherein the concentrate comprises up to 65% by weight of the one or more solid coloring pigments.

14. The method of claim 12, wherein the concentrate comprises more than 50% by weight of one or more solid coloring pigments.

15. The method of claim 1, wherein the dispersed coloring pigment comprises at least one of Phthalocyanine, Pigment Red, Pigment Yellow, and Diaryl Yellow.

16. The method of claim 1, wherein the concentrate has a specific density of from 0.9 to 2.0 g/cm$^3$.

17. The method of claim 1, wherein a pellet has a volume of from about 0.5 to 1.0 cm$^3$.

18. The method of claim 1, wherein the pellets comprise more than 50% by weight of one or more solid pigments.

19. The method of claim 1, wherein the pellets are substantially spherical.

20. The method of claim 1, wherein the dispersed coloring pigment has been produced by contacting coloring pigment and vehicle in at least one of a triple-roll mill, a ball mill, a kneader and an extruder.

21. The method of claim 20, wherein the dispersed coloring pigment has been produced by contacting coloring pigment and vehicle in an extruder.

22. A method of reducing the tackiness of a printing ink concentrate, wherein the concentrate is a concentrate for an offset printing ink which comprises a vehicle and dispersed solid coloring pigment and the method comprises increasing the solids content of the concentrate to render the concentrate capable of being comminuted and further comprises coating the concentrate.

23. The method of claim 22, wherein the concentrate has a pigment concentration of at least 45% by weight.

24. The method of claim 23, wherein the concentrate has a pigment concentration of more than 50% by weight.

25. A process for making a printing ink, wherein the process comprises diluting a coated printing ink concentrate obtained by the method of claim 1.

26. The method of claim 22, wherein the coating comprises a direct application of a powdery solid onto the comminuted concentrate.

27. The method of claim 22, wherein the coating comprises an application of a powdery solid in a liquid carrier onto the comminuted concentrate and a subsequent evaporation of the liquid carrier.

28. The method of claim 22, wherein the coating comprises applying a melted substance onto the comminuted concentrate.

29. The method of claim 22, wherein the coating comprises applying a substance dissolved in a solvent onto the comminuted concentrate and subsequently evaporating the solvent.

30. The method of claim 22, wherein the comminuted concentrate is coated with one or more substances selected from powdery materials, waxes, and liquids.

31. The method of claim 30, wherein the comminuted concentrate is coated with an oil.

32. The method of claim 30, wherein the comminuted concentrate is coated with a powdery material comprising at least one of chalk, kaolin, paraffin waxes, PE waxes, Fischer-Tropsch waxes, and talcum.

33. The method of claim 32, wherein the powdery material comprises talcum.

34. The method of claim 32, wherein the powdery material comprises at least one of chalk and kaolin.

35. The method of claim 22, wherein the dispersed coloring pigment comprises at least one of Phthalocyanine, Pigment Red, Pigment Yellow, and Diaryl Yellow.

36. The method of claim 22, wherein the concentrate has a specific density of from 0.9 to 2.0 $g/cm^3$.

37. The method of claim 8, wherein the powdery material comprises kaolin.

38. The method of claim 8, wherein the powdery material comprises chalk.

39. The method of claim 8, wherein the powdery material comprises a Fischer-Tropsch wax.

* * * * *